United States Patent [19]

Everett, Jr.

[11] Patent Number: 4,851,661

[45] Date of Patent: Jul. 25, 1989

[54] PROGRAMMABLE NEAR-INFRARED RANGING SYSTEM

[75] Inventor: Hobart R. Everett, Jr., San Diego, Calif.

[73] Assignee: The United States of America as represented by the Secretary of the Navy, Washington, D.C.

[21] Appl. No.: 160,944

[22] Filed: Feb. 26, 1988

[51] Int. Cl.⁴ ............................................. G01V 9/04
[52] U.S. Cl. .................. 250/221; 250/222.1
[58] Field of Search ............................ 250/221, 222.1; 356/0.4, 5, 28

[56] References Cited

U.S. PATENT DOCUMENTS 3,951,549 4/1976 Fowler et al. ......................... 356/4
4,458,146 7/1984 Reiner et al. ....................... 250/221
4,713,545 12/1987 Norrgren et al. .................... 250/221

Primary Examiner—David C. Nelms
Assistant Examiner—Eric F. Chatmon
Attorney, Agent, or Firm—Harvey Fendelman; Thomas Glenn Keough

[57] ABSTRACT

A high angular resolution ranging system particularly suitable for indoor applications involving mobile robot navigation and collision avoidance uses a programmable array of light emitters that can be sequentially incremented by a microprocessor. A plurality of adjustable level threshold detectors are used in an optical receiver for detecting the threshold level of the light echoes produced when light emitted from one or more of the emitters is reflected by a target or object in the scan path of the ranging system.

15 Claims, 4 Drawing Sheets

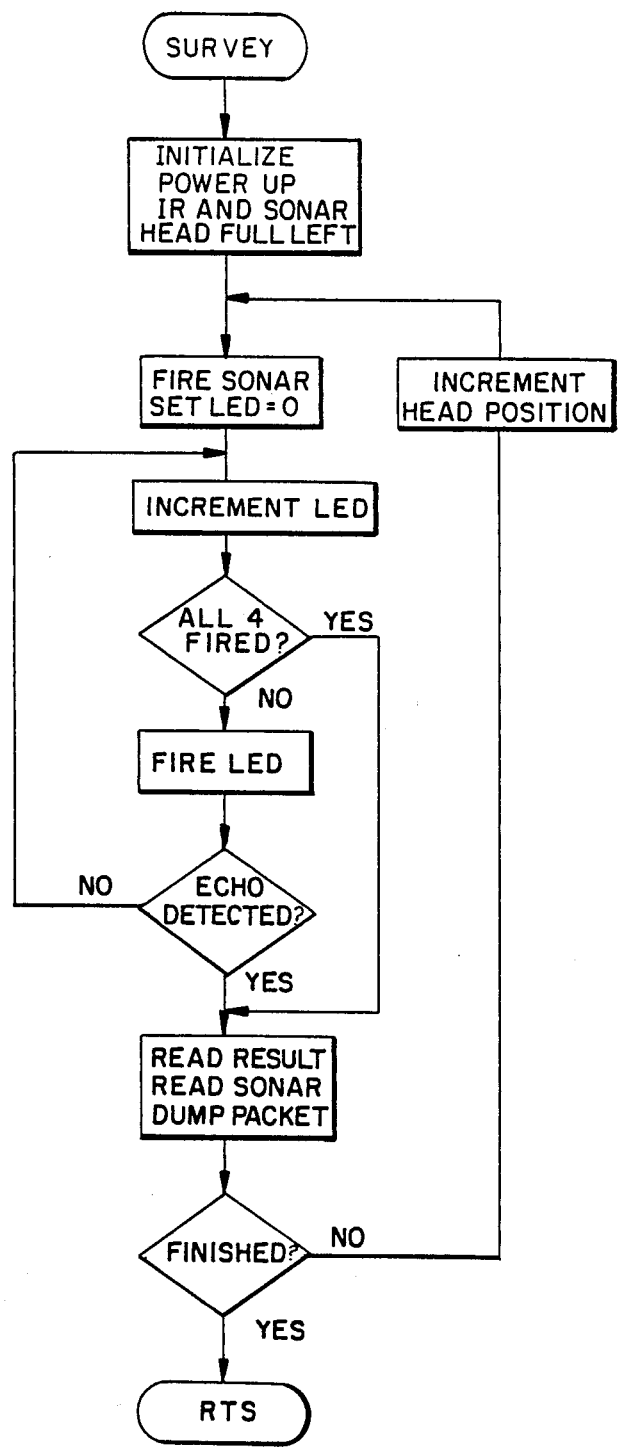

PROGRAMMABLE NEAR-INFRARED RANGING SYSTEM

STATEMENT OF GOVERNMENT INTEREST

The invention described herein may be manufactured and used by or for the Government of the United States for governmental purposes without the payment of any royalty thereon or therefor.

BACKGROUND OF THE INVENTION

The present invention relates generally to the field of ranging systems and, more particularly, to the field of ranging systems that are particularly suitable for use in autonomous mobile robotic systems. One of the most significant issues hindering the development of autonomous mobile robotic systems today is the lack of appropriate sensors for collecting high-resolution geometric information describing the robot's surroundings. Scanning laser rangefinders have found use in this regard, primarily in outdoor scenarios, and numerous configurations are being developed by several companies. The physical size, power consumption, and high initial cost of these prototype units make them somewhat impractical for near-term utilization on the smaller platforms typical of indoor applications. Simpler and much less expensive ultrasonic ranging systems have been employed with some limited success, principally for purposes of collision avoidance. Such systems suffer markedly, however, from numerous problems associated with the temperature dependence of the speed of sound in air, extremely slow wave propagation velocities, specular reflection of the emitted wavefront, and especially poor angular resolution due to beam divergence.

Ultrasonic ranging systems have been used on mobile robotic systems but not without problems, however. For instance, the speed of sound in air is proportional to the square root of the ambient temperature in degrees Rankine. For the temperature variations likely to be encountered in indoor applications, this can result in a significant effect, even considering the short ranges involved. A system calibrated at 70° F. but operating at an ambient temperature of 50° F. can produce a range error as large as eight inches at a distance of 35 feet.

Other sources of error in ultrasonic ranging systems can be attributed to the properties of the target surface, the transducer used, or the timing and processing circuitry and software. In addition, random electrical or ultrasonic noise, if not properly discriminated by the receiver circuitry, can lead to erroneous information but, for the most part, the more significant errors arise from the various ways the ultrasonic beam emitted by the transducer interacts with the target.

The width of the beam is determined by the transducer diameter and the operating frequency. The higher the frequency of the emitted energy, the narrower and more directional the beam, and hence the higher the angular resolution. Unfortunately, an increase in frequency also causes a corresponding increase in signal attenuation in air, decreasing the maximum range of the system.

Beam divergence is perhaps the most significant problem with ultrasonic ranging systems, introducing considerable uncertainty in the angular resolution of an object's position. For example, one such ultrasonic system manufactured by Polaroid was experimentally found to have an effective beamwidth of 36 inches at a range of only 6 feet from the sensor. Very narrow vertical targets essentially grow an amount equal to the width of the beam, resulting in relatively large regions of floor space that appear to be obstructed. More importantly, an opening such as a doorway just 7 feet away may not be discernible at all to the robot, simply because at that distance the beam is wider than the door opening.

Another problem is encountered when the angle of incidence of the beam decreases below a certain critical angle, and the reflected energy does not return to the transducer. This occurs because most targets exhibit specular reflection characteristics as opposed to diffuse characteristics with respect to the relatively long wavelength of ultrasonic energy.

SUMMARY OF THE INVENTION

The programmable proximity detector of the present invention overcomes the foregoing problems associated with using acoustic ranging techniques for gathering data on the surroundings of a mobile platform such as a mobile robot. The system of the present invention is comprised of a near-infrared energy source which illuminates the scene of interest and a photodiode detector situated at the focal point of a parabolic reflector. As compared to ultrasonic energy, the shorter near-infrared wavelength 880 nanometers) used in the present invention greatly reduces problems associated with specular reflection. Furthermore, the speed of light offers significant advantages over the slow wave propagation velocities characteristic of sonar systems operating in air. The biggest improvement, however, arises from the excellent angular resolution afforded by the optics. The ranging system of the present invention may thereby be efficiently used as a head-mounted sensor on a robotic platform that scans the irradiated scene looking for reflected energy that signifies the presence or absence of any object. The fact that the parabolic reflector used in the present invention focuses on only a small portion of the illuminated target results in the highly directional characteristic desired.

Accordingly, a hybrid ranging system described herein including both a sonar ranging system and the near-infrared system of the present invention may be installed on a mobile robot. By combining the best features from each sensor, a representation can be built that is more accurate than if either sensor were used alone. A refined map can thereby be generated by combining, the data from both the ultrasonic and near-infrared systems, and subsequently presenting it to a higher level program such as a path planner.

The near-infrared programmable ranging system of the present invention is an enhanced second-generation version of a near-infrared proximity detector disclosed and described in "A Microprocessor Controlled Autonomous Sentry Robot", H. R. Everett, Master's Thesis, Naval Postgraduate School, Oct, 1982. Whereas the proximity detector described in the aforementioned thesis is a near-infrared system, the proximity detector illustrated in the thesis has a single-intensity-level near-infrared light emitting diode that is not programmable to adjust the radiated output intensity. Further, the detector described in the aforementioned thesis does not use separately adjustable threshold detectors in the optical receiver and therefore has limited utility and capability in that no range resolution is possible.

The present invention on the other hand utilizes a programmable array of emitters that enables selective variation in the radiated output light intensity. The number of active emitters in the array can be sequentially incremented by a microprocessor for facilitating range determination. A plurality of separately adjustable threshold detectors in the optical receiver further facilitates range determination in the present invention.

OBJECTS OF THE INVENTION

Accordingly, it is the primary object of the present invention to disclose a ranging system capable of gathering high-resolution angular information.

It is a further object of the present invention to disclose a novel ranging system that enables the detection and location of the edges of objects rapidly and expediently.

It is a still further object of the present invention to disclose a near-infrared ranging system that can be used in conjunction with ultrasonic rangefinders.

It is a further object of the present invention to disclose a novel low cost alternative to ultrasonic ranging systems.

Another object of the present invention is a ranging system that is less susceptible than acoustical systems to problems associated with specular reflection due to the shorter wavelength of the near-infrared energy utilized.

A concomitant object of the present invention is the disclosure of a ranging system that enables faster data acquisition than ultrasonic ranging due to the fact that it operates at the speed of light as opposed to the speed of sound.

A still further object of the present invention is a ranging system that is not effected by ambient temperature and that is insensitive to ambient lighting conditions.

These and other objects of the invention will become more readily apparent from the ensuing specification and drawings when taken in conjunction with the appended claims.

BRIEF DESCRIPTION OF THE DRAWINGS

FIG. 4 is a flow chart of the microprocessor programming utilized in the present invention.

DESCRIPTION OF THE PREFERRED EMBODIMENT

Figure 1:
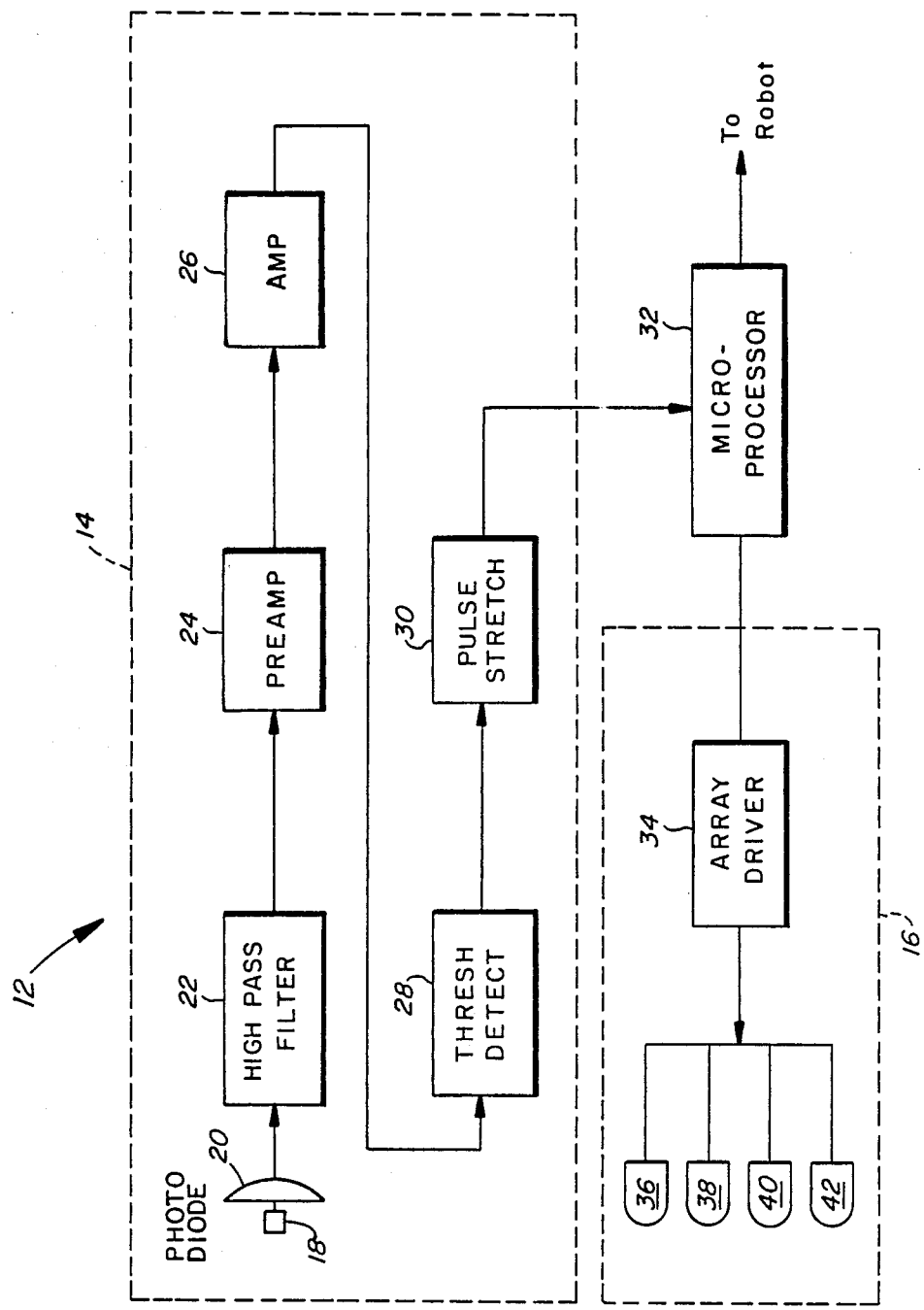
FIG. 1 is a block diagram of the programmable near-infrared ranging system of the present invention.

Referring to FIG. 1 the programmable near-infrared ranging system 12 of the present invention will be described with respect to the functional block diagram illustrated therein. The ranging system 12 may be considered to be comprised of a receiver portion indicated generally by the dashed rectangle 14 and a transmitter portion indicated generally by the dashed rectangle 16 in FIG. 1. The receiver portion 14 includes a photodetector diode 18 situated at the focal point of a parabolic reflector 20 which may, for instance, be a 2"×4" parabolic reflector. The photodetector diode 18 is used to detect light "echoes" or reflections from the near-infrared energy pulses emitted by the transmitter portion 16. The output of the photodetector diode 18 is furnished to high pass filter network 22, the output of which is sent to preamplifier 24. The output of preamplifier 24 is amplified by amplifier 26 which produces a positive spike for each burst of infrared echo energy detected. The spikes are inverted by an array of inverters which are included in the threshold detector network 28. The output of threshold detector network 28 is furnished to an array of follow-on comparator stages that comprise pulse stretchers 30 which output a square wave for each echo spike detected. By utilizing individually adjustable threshold comparators in the threshold detector network 28, the receiver 14 sensitivity can be adjusted for various detection ranges and sensitivity levels.

The transmitter 16 portion of the ranging system 12 of the present invention receives information from microprocessor 32. Microprocessor 32 receives object detection information from the receiver 14 via pulse stretcher 30. The microprocessor 32 is programmed to provide output signals to the array driver network 34 which in turn drives the array of transmitters or emitters 36, 38, 40 and 42. Emitters 36, 38, 40 and 42 are preferably high power LEDs or super luminescent diodes (SLDS) radiating in the near-infrared frequency range. While FIG. 1 illustrates four emitters it is to be understood that it is within the scope of the present invention that a fewer or greater number of emitters could be utilized, depending on the required range resolution.

Microprocessor 32 is programmed in accordance with the flow chart illustrated in FIG. 4 with a subroutine identified herein as "Survey". The "Survey" subroutine illustrated by the flow chart in FIG. 4 is described herein, by way of example, for utilization on a mobile robot equipped with the near-infrared ranging system of the present invention operating in conjunction with an ultrasonic ranging system. As is seen in FIG. 4 the subroutine begins with the step of initializing and applying power to the near-infrared ranging system as well as the ultrasonic ranging system in conjunction with which the present invention is preferably used. The mobile robot is instructed to turn its head full left. Next, the ultrasonic ranging system is activated and the microprocessor 32 ensures that all of the LED emitters, are off. The microprocessor 32 then checks to see if all of the emitters have yet been activated and if not then one of the emitters is activated. Microprocessor 32 then checks its input from the receiver 14 to determine if reflected near-infrared energy has been detected. If no echo has been detected then an additional emitter is activated to increase the light intensity output of the transmitter 16. This sequencing is repeated until either an echo is detected or all of the emitters in the array of emitters have been activated. When an echo has been detected, the microprocessor obtains a reading of the threshold level obtained from the receiver 14 to thereby obtain a measure of the threshold detection results. The number of active emitters as well as the threshold detection results are then combined with the sonar range reading such that the angular information obtained from the near-infrared ranging system and the range information obtained from the sonar can be combined to generate a highly accurate internal map of the area surrounding the robot. A 6502 source code listing suitable for use in the programming of 6502 microprocessor 32 is provided in Table II at the end of this specification.

Figure 2:
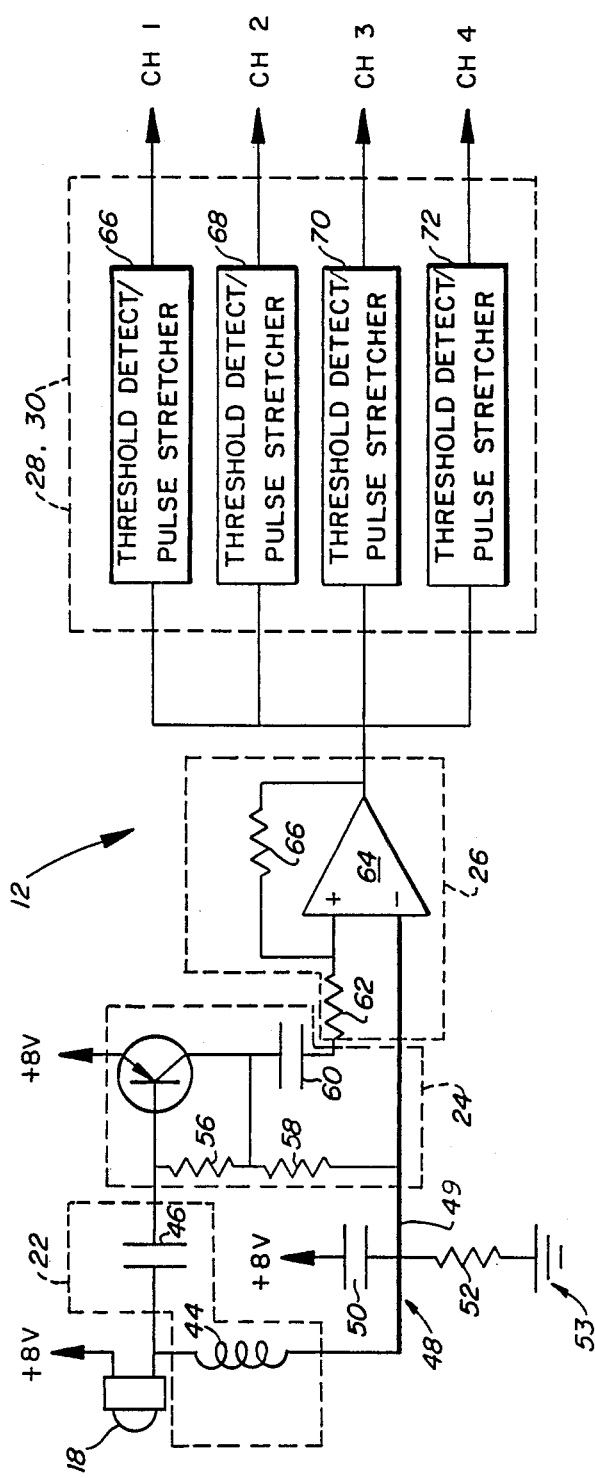
FIG. 2 is a schematic diagram of the receiver portion of the near-infrared ranging system of the present invention.
Figure 2A:
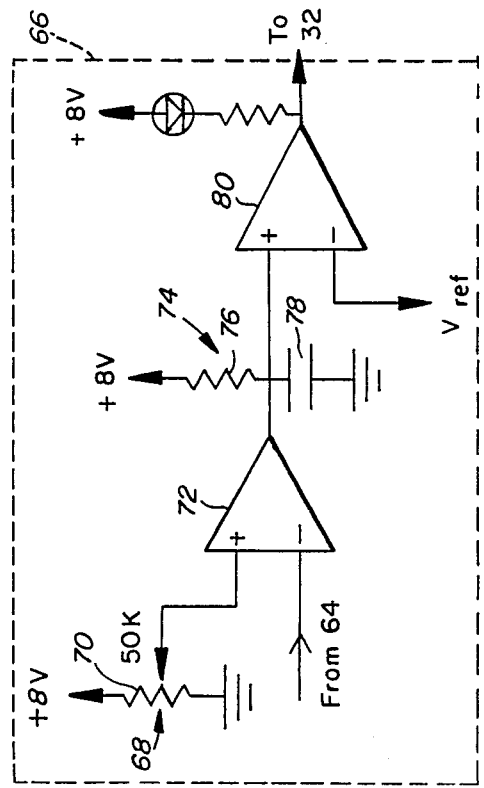
FIG. 2A is a detailed schematic diagram of the threshold detector/pulse stretcher of the present invention.
Figure 2B:
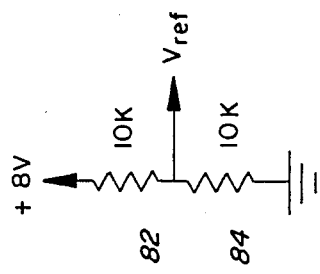
FIG. 2B is a schematic circuit diagram of the voltage reference source used in conjunction with the pulse stretcher of the present invention illustrated in FIG. 2A.

Referring now to FIGS. 2, 2A and 2B, the receiver portion of the present invention will be described in detail. As shown in FIG. 2A photodetector diode 18 is connected to a positive DC voltage supply of, for example, 8 volts. The other terminal of photodetector diode 18 is connected through high pass filter 22 to the preamplifier 24. The high pass filter 22 is comprised of an LC circuit including inductor 44 connected with capacitor 46. Decoupling filter 48 is used for decoupling the receiver 12 power supply from the transmitter 16 especially during switching of the array of emitters 36, 38, 40 and 42. The decoupling filter 48 is comprised of filter capacitor 50 connected between a positive voltage supply, e.g. 8 volts, and receiver ground 49 as is illustrated and further comprises decoupling resistor 52 connected between receiver ground 49 and system ground 53.

Preamplifier 24 is comprised of PNP transistor 54 and the bias network comprising resistors 56 and 58 connected as illustrated. Coupling capacitor 60 within the preamplifier stage 24 connects the preamplifier 24 via input resistor 62 to the operational amplifier 64. Feedback resistor 66 is connected between the positive input terminal of operational amplifier 64 and its output as illustrated. The output of photodiode 18 is thus filtered by high pass filter 22, passed to preamplifier 24 and amplified by amplifier 26 which produces a positive spike for each burst of returned infrared energy detected.

These spikes are inverted by an array of inverter/threshold detectors connected at the output of operational amplifier 64. More particularly, there is an array of threshold detector/pulse stretchers 66, 68, 70 and 72 connected in parallel and each having its input connected to the output of operational amplifier 64. It is to be understood that, within the scope of the present invention, although four threshold detector/pulse stretchers are illustrated in FIG. 2, fewer or greater numbers could be used.

With the exception noted below, each of the threshold detector/pulse stretchers 66, 68, 70 and 72 is identical. With reference to FIG. 2A threshold detector/pulse stretcher 66 is illustrated in detail. Threshold detector/pulse stretcher 66 includes threshold adjusting circuit 68 comprised of potentiometer 70 connected as illustrated between the positive voltage supply, e.g. 8 volts and ground. By adjusting the potentiometer 70, the threshold level of detection of each of the detectors 66, 68, 70 and 72 may be individually varied and made a distinct and different value from each of the other detectors. The output of potentiometer 70 is provided to the positive input of comparator 72. Comparator 72 inverts the spikes at the output of operational amplifier 64 resulting from detection of light echoes from the light pulses emitted from emitters 36, 38, 40 and 42. When the output spike from operational amplifier 64 is greater than the value at the positive terminal of comparator 72 as established by potentiometer 70, then an inverted spike is provided at the output of comparator 72. The spike at the output of comparator 72 is furnished via resistor/capacitor network 74 comprised of resistor 76 and capacitor 78 to the positive input of follow-on comparator 80. The negative input of comparator 80 is connected to a voltage reference which may be derived from the 8 volt supply by voltage dividing resistors 82 and 84 as is illustrated in FIG. 2B. The comparator 80 in conjunction with resistor/capacitor network 74 acts as a pulse stretcher providing, for example, a 5 ms square wave output for each spike detected. It is emphasized that each of the threshold detector/pulse stretchers 66, 68, 70 and 72 are intended to be provided with a different setting on each potentiometer 70 such that each threshold detector is activated at a different threshold level. The receiver 12 sensitivity is thus broken into a number of discrete levels, four in the present illustration, by the individually adjustable threshold comparators 72. A strong return will cause all four channel outputs to go low, whereas a weak return will cause only the most sensitive channel to indicate detection of an echo signal. Range information can thus be inferred from the strength of the returned energy. The output of each comparator 80 is furnished as an input microprocessor 32 for processing a determination of the number of emitters to activate as will be described below and for utilization in a master path planner program as might be used with a mobile robot. The receiver output from the collective output states of all comparators 80 thus may be considered to be a course indication of detected object range.

The varying reflectivity of different surfaces preclude the signal strength at the output of comparator 80 from being a highly reliable indicator of distance. This is more a function of surface topography than of surface color. Varying surface characteristics create uncertainties that thwart attempts to establish a practical correlation between signal strength and exact target distance. The present invention therefore is intended for use to provide good angular resolution to complement the excellent range resolution that can be afforded by an ultrasonic rangefinder which the present invention can be used in conjunction with. So long as the detector of the present invention is used to find the left and right hand boundaries of an object, an acoustical sensor which in itself has inherently poor angular resolution can in most cases supply accurate range information.

The receiver 14 of the present invention thus acts as an electronic "cane" which a mobile robot can wave around to find prominent vertical edges with great angular accuracy. Because of the binary nature of the information provided by the output of detector 14 of the present invention, i.e. an object is either present or not present, receiver 14 of the present invention in actuality indicates the presence or absence of a target somewhere along the optical axis of the field of view, out to its maximum range. For mobile robot applications such data can become meaningless in congested environments. Also, if the range is shortened to allow detection of close proximity objects but not those further away, an incomplete picture is presented to the mobile robot. The present invention over comes this problem by incorporating what may be analogized to a telescoping cane for a blind man. The robot can use this feature to "feel" around out to a distance of five or six feet, noting those regions that are obstructed. The range of the sensor can then be extended a few feet more, and those areas that show no reflected energy are probed again. This process, in accordance with the present invention, is repeated at computer speed until the sensor has mapped the entire region out to its maximum possible range. Implementation of this telescoping cane feature is provided by utilizing control over the amount of emitted near-infrared light energy. As previously mentioned, an array of high-power emitters, preferably LEDs or SLDs, is employed to increase the power density of the transmitted pulse. By controlling the number of emitters that are enabled at any given time by microprocessor 32, the maximum possible range becomes programmable.

Figure 3:
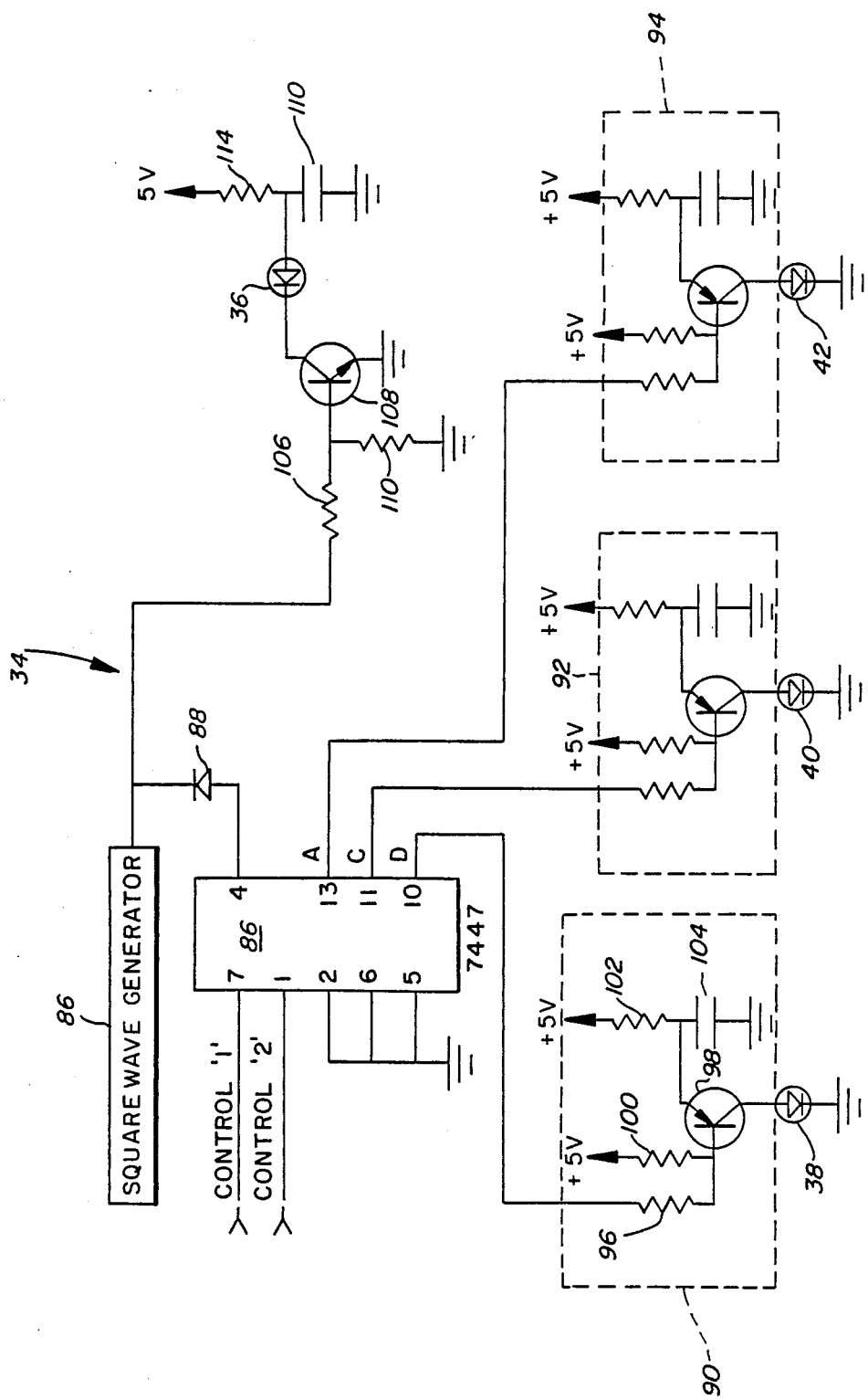
FIG. 3 is a schematic block diagram of the transmitter portion of the present invention, detailing the LED array driver.

Referring now to FIG. 3 the network utilized to effectuate the above described programmable range control will be described. In the present example four LEDs operating in the near-infrared range, preferably 880 nanometers, are utilized. It is to be understood, however, that it is within the scope of the present invention to use a fewer or greater number of emitters than is illustrated in FIG. 3 to be dictated by the range and accuracy requirements. Specifically, each of the emitters 36, 38, 40 and 42 is connected in an emitter drive circuit to be described in detail below. A binary-coded-decimal to seven-segment decoder/driver 86 is used to control three of the four emitters in the array, namely, emitters 38, 40 and 42. Emitter 36 is always enabled and fires when activated by the square wave output from square wave generator 86. The output of square wave generator 86 is also provided to pin 4 of decoder 86, the blanking output, via diode 88. When the voltage at pin 4 is low all emitters controlled by the decoder 86 are turned off. The binary voltage levels applied to control inputs "1" and "2" on pins 7 and 1, respectively, of decoder 86 determine which emitters are enabled for activation by the square wave pulses applied to pin 4. Thus, if the control inputs are both low, only one emitter will be pulsed by the drive circuitry. If a binary "1" is present then 2 emitters will be active. A binary "2" will enable three mmitters and so forth. By setting the value of these control inputs, the microprocessor 32 specifies the total number of active emitters to be any value, between one and four, in the present example.

Each of the emitters 38, 40 and 42 are driven by an identical emitter drive circuit 90, 92 and 94. Since each of the circuits 90, 92 and 94 are identical, only one such circuit will be described in detail. Emitter drive circuit 90 used to drive emitter 38 is comprised of a current limiting resistor 96 connected to the base of PNP transistor 98. A positive voltage supply such as, for example, a 5 volt voltage supply, is also connected to the base of transistor 98 via bias resistor 100. Current limiting resistor 102 is connected to the emitter of transistor 98 and LED drive capacitor 104 is connected between the emitter of transistor 98 and ground. The top terminal of resistor 102 is connected to a positive voltage supply such as the 5 volt voltage supply to which resistor 100 is connected.

Each of the transistors 98 in the drive circuits 90, 92 and 94, respectively are connected, respectively, to one of the outputs D, C and A of decoder 86. When a negative signal is applied on any of the output lines D, C or A, such negative signal triggers the corresponding transistor 98 into saturated conduction. When such transistor 98 is thus triggered on, drive capacitor 104, previously charged from the positive 5 volt voltage supply through resistor 102, discharges through the transistor, activating its associated LED 38, 40 or 42 into emission. Thus, as described above microprocessor 32, by controlling the binary voltage level applied to control inputs "1" and "2" at pins 7 and 1, respectively determines which of the LEDs 38, 40 or 42 is activated to emit near-infrared light.

LED emitter 36 is connected in a drive circuit similar to drive circuits 90, 92 and 94. More particularly, the output of square wave generator 86 is connected via current limiting resistor 106 to the base of NPN transistor 108. Bias resistor 110 is connected between the base of transistor 108 and ground. The emitter of transistor 108 is connected to ground as illustrated. LED 36 is connected between the collector of transistor 108 and the top terminal of capacitor 112 which has its other terminal connected to ground. The anode of LED 36 is also connected via resistor 114 to the positive voltage supply illustrated as a 5 volt voltage supply. It can thus be readily appreciated that each time the square wave generator generates a positive pulse that transistor 108 is triggered into saturation thereby permitting the discharge of capacitor 112 through LED 36 and thereby activating LED 36.

It can further be appreciated that microprocessor 32 thus controls the total number of active LEDs to be any value between one and four. This in turn fixes the maximum range of the near-infrared ranging system of the present invention. As an example, the system 12 of the present invention is capable of "seeing" out to an average of six feet with one LED active, ten feet with two LEDs active, thirteen feet with three and a maximum average range of fifteen feet attainable with all four LEDs active.

The data protocol employed for communicating the information derived from the operation of the system 12 of the present invention to a mobile robot is of the form of a single byte in which the upper nibble represents the number of LEDs that were fired before a reflection was observed and the lower nibble represents the number of comparators in the receiver threshold detection stage that responded to the returned energy.

As an example, the result "14" would indicate that only one LED was needed to generate a return sufficiently strong so as to trigger all four threshold detectors, implying that the target was relatively close. As a further example, the result "41" would signify that four LEDs were required to obtain an echo with only the most sensitive threshold detector responding thereby indicating that the target was a considerable distance away. A "40 " would be interpreted as meaning there was no target within range of all four LEDs. This information can be passed to a computer in the control hierarchy of the robot for further distribution as needed for navigational planning routines.

Table I that follows is provided by way of example and is a listing of the value or suitable part number that can be used for implementation for each of the components of the present invention.

Obviously, many modifications and variations of the present invention are possible in the light of the above teachings. It is therefore to be understood that within the scope of the appended claims the invention may be practiced otherwise than as specifically described.

TABLE I

| | |
|---|---|
| Photodetector 18 | TIL 413 |
| LED's 38, 40, 42 | XC-880-A |
| Inductor 44 | 6H |
| Capacitor 46 | 220pF |
| Capacitor 50 | 100F |
| Resistor 52 | 100 |
| Transistor 54 | 2N3705 |
| Resistor 56 | 2.2M |
| Resistor 58 | 220K |
| Capacitor 60 | .01F |
| Resistor 62 | 1K |
| Operational Amplifier 64 | 741 |
| Potentiometer 70 | 50K |
| Comparator 72 | LM339 |
| Resistor 76 | 1M |
| Capacitor 78 | .001F |
| Comparator 80 | LM339 |

TABLE I-continued

| | |
|---|---|
| Resistor 82 | 10K |
| Resistor 84 | 10K |
| Decoder 86 | 7447 |
| Resistor 96 | 1K |
| Transistor 98 | TIP125 |
| Resistor 100 | 10K |
| Resistor 102 | 10 |
| Capacitor 104 | 100F |
| Resistor 106 | 1K |
| Transistor 108 | TIP120 |
| Resistor 110 | 10K |
| Capacitor 112 | 100F |
| Resistor 114 | 10 |

The source code listing in Table II below is intended for use in conjunction with the flow chart of FIG. 4 of the accompanying patent application. Table II is, by way of example, a listing of a source code which may be used for programming microprocessor 32 of the present invention to control both the programmable near-infrared ranging system and a complementary ultrasonic ranging system. This source code is lited in 6502 assembly language mnemonic code.

TABLE II

| | | | |
|---|---|---|---|
| 0735 | survey | jsr initial | ;initialize robot |
| 0740 | | jsr if.on | ;power up robot interface |
| 0745 | | jsr cpu5.on | ;power up speech computer |
| 0750 | | jsr cpu2.on | ;power up robot head controller |
| 0755 | | jsr cpu3.on | ;power up sonar computer |
| 0760 | | jsr ir.on | ;energize I/R circuitry |
| 0765 | | jsr delay1 | |
| 0770 | look | lda #$ee | |
| 0775 | | jsr son.com | ;power up sonar MUX |
| 0780 | | jsr hnd.shk | ;head shake sonar |
| 0785 | | ldx #$ff | ;head 90 deg left |
| 0790 | | stx count | |
| 0795 | | jsr posit | ;position head |
| 0800 | | jsr delay4 | ;wait to position |
| 0805 | look1 | jsr son.one | ;fire sonar #1 |
| 0810 | | lda count | |
| 0815 | | tax | |
| 0820 | | jsr posit | ;incrementally position head |
| 0825 | | ldy start | |
| 0830 | | lda rng.hi,Y | ;output sonar range |
| 0835 | | jsr outbyt | |
| 0840 | | lda rng.lo,Y | ;as two bytes |
| 0845 | | jsr outbyt | |
| 0850 | | jsr space | |
| 0855 | | jsr space | |
| 0865 | | jsr ir.rng | ;fire and read programmable near infrared range unit |
| 0870 | | jsr crlf | |
| 0875 | | dec count | ;decrement head position |
| 0880 | | bne look1 | ;loop if not finished |
| 0885 | | rts | |
| 0890 ; | | | |
| 0895 | son.one | lda #$11 | ;sonar #1 only |
| 0900 | | jsr son.com | ;send command to sonar computer |
| 0905 | | jsr delay.5 | ;wait for echo |
| 0910 | | jsr hnd.shk | ;read back results |
| 0915 | | rts | |
| 0920 ; | | | |
| 0925 | outbyt | pha | ;RS-232 dump routine |
| 0930 | | pha | |
| 0935 | | lsr A | |
| 0940 | | lsr A | |
| 0945 | | lsr A | |
| 0950 | | lsr A | |
| 0955 | | jsr nbasoc | |
| 0960 | | jsr delay | |

TABLE II-continued

| | | | |
|---|---|---|---|
| 0965 | | pla | |
| 0970 | | jsr nbasoc | |
| 0975 | | pla | |
| 0980 | | rts | |
| 0985 ; | | | |
| 0990 | delay | lda #$ff | ;delay routine |
| 0995 | | sta t2clo | |
| 000 | | lda #$ff | |
| 1005 | | sta t2chi | |
| 1010 | chkt1 | lda #$20 | |
| 1015 | | bit ifr2 | |
| 1020 | | beq chkt1 | |
| 1025 | | lda t2clo | |
| 1030 | | rts | |
| 1035 ; | | | |
| 1040 | ir.rng | lda #$0 | |
| 1045 | | sta LED | ;holds number of LEDs, - 1, which emit |
| 1050 | loop1 | asl LED | ;shift to lower nibble |
| 1055 | | asl LED | |
| 1060 | | lda ora3 | ;get port to set PA2 & PA3 |
| 1065 | | and #$f3 | ;mask for pins 3 & 4 |
| 1070 | | ora LED | ;set how many to emit (less one) |
| 1075 | | sta ora3 | ;fire! |
| 1080 | | lsr LED | ;shift back |
| 1085 | | lsr LED | |
| 1090 | | ldy #$ff | ;this is for a delay |
| 1095 | loop2 | ldx #$7f | ;read selector 7 pin 12 |
| 1100 | loop3 | jsr sel.chk | ;checks the selector |
| 1105 | | bvc out.res | ;branch if low to output results |
| 1110 | | dex | |
| 1115 | | cpx #$7b | ;up to four detectors could have detected |
| 1120 | | bne loop3 | |
| 1125 | | dey | |
| 1130 | | bne loop2 | ;check all four detectors each loop |
| 1135 | | inc LED | ;fire another LED |
| 1140 | | lda #$4 | |
| 1145 | | cmp LED | ;finished? |
| 1150 | | bne loop1 | |
| 1155 | | dec LED | ;make it back to a 4 |
| 1160 | out.res | inc LED | ;actual number of LEDs fired |
| 1165 | | asl LED | |
| 1170 | | asl LED | |
| 1175 | | asl LED | |
| 1180 | | asl LED | ;shift to upper nibble |
| 1185 | | txa | |
| 1190 | | cmp #$80 | ;now get number that detected |
| 1195 | | beq out.1 | |
| 1200 | | sec | |
| 1205 | | sbc #$7b | ;how many LEDs detected |
| 1210 | | jump out.2 | |
| 1215 | out.1 | lda #$00 | |
| 1220 | out.2 | ora LED | ;put number that detect in lower nibble |
| 1225 | | jsr outbyt | ;output result |
| 1230 | | lda ora3 | |
| 1235 | | and #$f3 | |
| 1240 | | sta ora3 | |
| 1245 | | rts | |
| 1250 ; | | | |
| 1255 | sel.chk | lda #$ff | ;ensure output |
| 1260 | | sta ddra4 | |
| 1265 | | stx ora4 | ;set desired input |
| 1270 | | bit ora3 | ;read selector input x |
| 1275 | | rts | |
| 1280 ; | | | |
| 1285 | ir.on | lda ora3 | ;enable I/R circuitry |
| 1290 | | and #$ef | ;by setting PA4 low |
| 1295 | | jmp ir | |
| 1300 | ir.off | lda ora3 | ;disable I/R circuitry |
| 1305 | | ora #$10 | |
| 1310 | ir | sta ora3 | |
| 1315 | | rts | |
| 1320 ; | | | |
| 1325 | ir.tst | lda #'? | ;a test stub |

TABLE II-continued

| | | |
|---|---|---|
| 1330 | jsr outchr | |
| 1335 | jsr inbyt | |
| 1340 | sec | |
| 1345 | sbc #$01 | ;subtract 1 for LED that's always enabled |
| 1350 | sta LED | |
| 1355 | asl LED | |
| 1360 | asl LED | |
| 1365 | lda ora3 | |
| 1370 | and #$f3 | ;mask for PA2 & PA3 |
| 1375 | ora LED | |
| 1380 | sta ora3 | |
| 1385 | rts | |
| 1390 ; | | |
| 1395 | .en | |

What is claimed is:

1. A ranging system comprising:
transmitter means for radiating light pulses, said transmitter means after having an on state for radiating light pulses and an off state when no light is radiated and including means for selectively varying the intensity of said radiated light pulses when in said on state; and
receiver means for detecting the existence of and intensity of light reflections from said light pulses as reflected by a reflector of light.

2. The ranging system of claim 1 wherein said receiver means comprises:
a plurality of threshold detectors, each being triggered in response to a different level of intensity of said light reflectors.

3. The ranging system of claim 2 wherein said transmitter means comprises:
means for sequentially incrementing the intensity of said transmitted light pulses.

4. The ranging system of claim 3 wherein said receiver means has an output and wherein said means for incrementing comprises:
a microprocessor having an input connected to the output of said receiver means and having an output;
a plurality of light emitters; and
means connected to said output of said microprocessor and to each of said light emitters for enabling the emission of light from one or more of said plurality of light emitters.

5. The ranging system of claim 3 wherein said means for enabling comprises:
a binary to seven segment converter having an input, said input being connected to said microprocessor and having a plurality of outputs, each of said plurality of outputs being connected to one of said light emitters.

6. The ranging system of claim 4 wherein said microprocessor is programmed to:
(a) enable at least one of said plurality of light emitters;
(b) determined if a light reflection has been received by said receiver means and, if not;
(c) enable at least one more of said plurality of light emitters; and the
(d) repeat said steps (b) and (c) above until a light reflection has been received or until each of said plurality of light emitters has been enabled.

7. The ranging system of claim 1 wherein said transmitter means comprising:
means for sequentially incrementing the intensity of said transmitted light pulses.

8. The ranging system of claim 7 wherein said receiver means has an output and wherein said means for incrementing comprises:
a microprocessor having an input connected to the output of said receiver means and having an output;
a plurality of light emitters; and
means connected to said output of said microprocessor and to each of said light emitters for enabling the emission of light from one or more of said plurality of light emitters.

9. The ranging system of claim 8 wherein said means for enabling comprises:
a binary to seven segment converter.

10. The ranging system of claim 8 wherein said microprocessor is programmed to:
(a) enable at least one of said plurality of light emitters;
(b) determined if a light reflection has been received by said receiver means and, if not;
(c) enable at least one more of said plurality of light emitters; and then
(d) repeat said steps (b) and (c) above until a light reflection has been received or until each of said plurality of light emitters has been enabled.

11. The ranging system of claim 2 wherein said receiver means comprises:
means for generating a signal in response to each said light reflection detected by said receiver means.

12. The ranging system of claim 11 wherein said means for generating a signal includes:
an output; and
each of said plurality of threshold detectors comprises:
a comparator for comparing the signal on the output of said means for generating with a reference signal.

13. The ranging system of claim 12 wherein:
there is a different reference signal applied to each of said comparators.

14. The ranging system of claim 11 wherein:
said radiated light pulses are in the near-infrared frequency range.

15. The ranging system of claim 7 wherein said means for sequentially incrementing the intensity of said transmitted light pulses increments the intensity of said transmitted light pulses in discreet steps.

* * * * *